United States Patent
Lorenz

Patent Number: 5,174,041
Date of Patent: Dec. 29, 1992

[54] METHOD FOR MEASURING A LENGTH AND ELECTRONIC SLIDE CALIPER

[75] Inventor: Marcel Lorenz, Gamprin, Liechtenstein

[73] Assignee: Aktiengesellschaft, Vaduz, Liechtenstein

[21] Appl. No.: 708,894

[22] Filed: May 31, 1991

[51] Int. Cl.⁵ .................. G01B 7/02; G01B 11/04
[52] U.S. Cl. ............................. 33/706; 33/708; 33/784; 356/373; 250/237 G
[58] Field of Search ........... 33/706, 707, 708, 784, 33/701, 702; 356/395, 396, 373, 374, 383; 250/237 G; 377/24

[56] References Cited

U.S. PATENT DOCUMENTS

| | | | |
|---|---|---|---|
| 2,875,524 | 3/1959 | Bower et al. | 33/708 |
| 2,886,718 | 5/1959 | Shepherd et al. | 33/706 |
| 4,180,704 | 12/1979 | Pettit | 250/237 G |
| 4,226,024 | 10/1980 | Westerberg et al. | 33/784 |
| 4,318,617 | 3/1982 | Orsen | 33/707 |
| 4,385,836 | 5/1983 | Schmitt | 33/707 |
| 4,461,083 | 7/1984 | Ernst | 33/707 |
| 4,628,201 | 12/1986 | Schmitt | 356/374 |
| 4,717,824 | 1/1988 | Sakamoto et al. | 356/395 |
| 4,912,322 | 3/1990 | Ichikawa | 356/373 |
| 5,010,655 | 4/1991 | Rieder et al. | 33/707 |
| 5,124,548 | 6/1992 | Igaki | 250/237 G |

FOREIGN PATENT DOCUMENTS

| | | | |
|---|---|---|---|
| 2020393 | 11/1971 | Fed. Rep. of Germany | 356/395 |
| 3409891 | 9/1985 | Fed. Rep. of Germany | 377/24 |
| 3417015 | 11/1985 | Fed. Rep. of Germany | 377/24 |
| 3631429 | 3/1988 | Fed. Rep. of Germany | 33/706 |
| 2228320 | 8/1990 | United Kingdom | 250/237 G |
| 8901602 | 2/1989 | World Int. Prop. O. | 33/706 |

*Primary Examiner*—Thomas B. Will
*Attorney, Agent, or Firm*—Kokjer, Kircher, Bowman & Johnson

[57] ABSTRACT

A method and an electronic slide caliper serve for measuring a length. The slide caliper comprises a rule and a slide which is arranged on the rule for longitudinal displacement and which is provided with two sensors which are offset relative to each other in the longitudinal direction in such a way that the zero passages of the signals generated by the sensors will not coincide. In order to be able to measure the lengths even in the presence of considerable drifts, the zero passages (ND) of the signals are determined by determining first maximum values (MX) and minimum values (MN) of the signal values (U) and deriving thereafter the zero passages (ND) as arithmetic mean value. By taking the average of a larger number of zero passages one then determines the respective zero level ($U_N$).

9 Claims, 8 Drawing Sheets

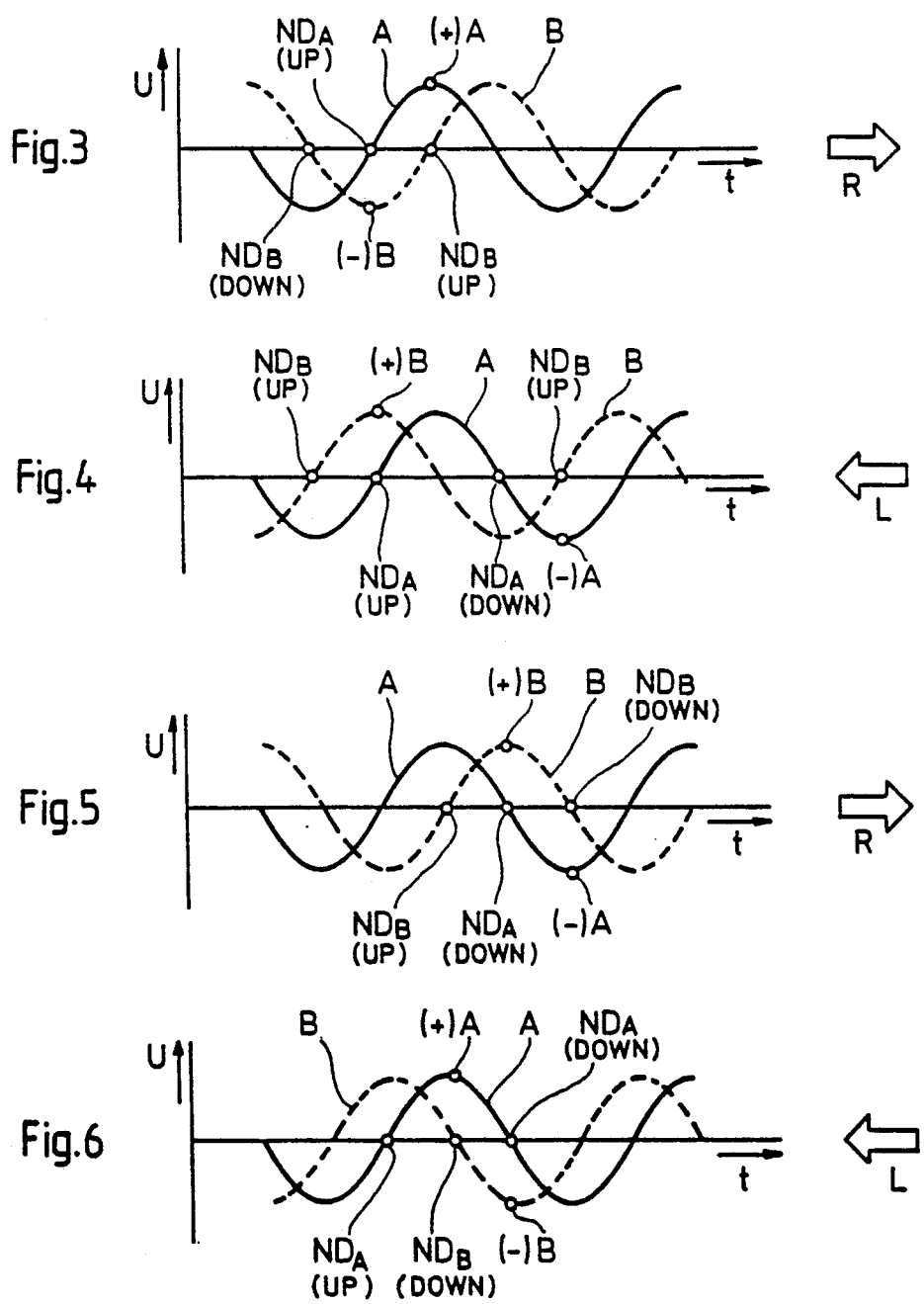

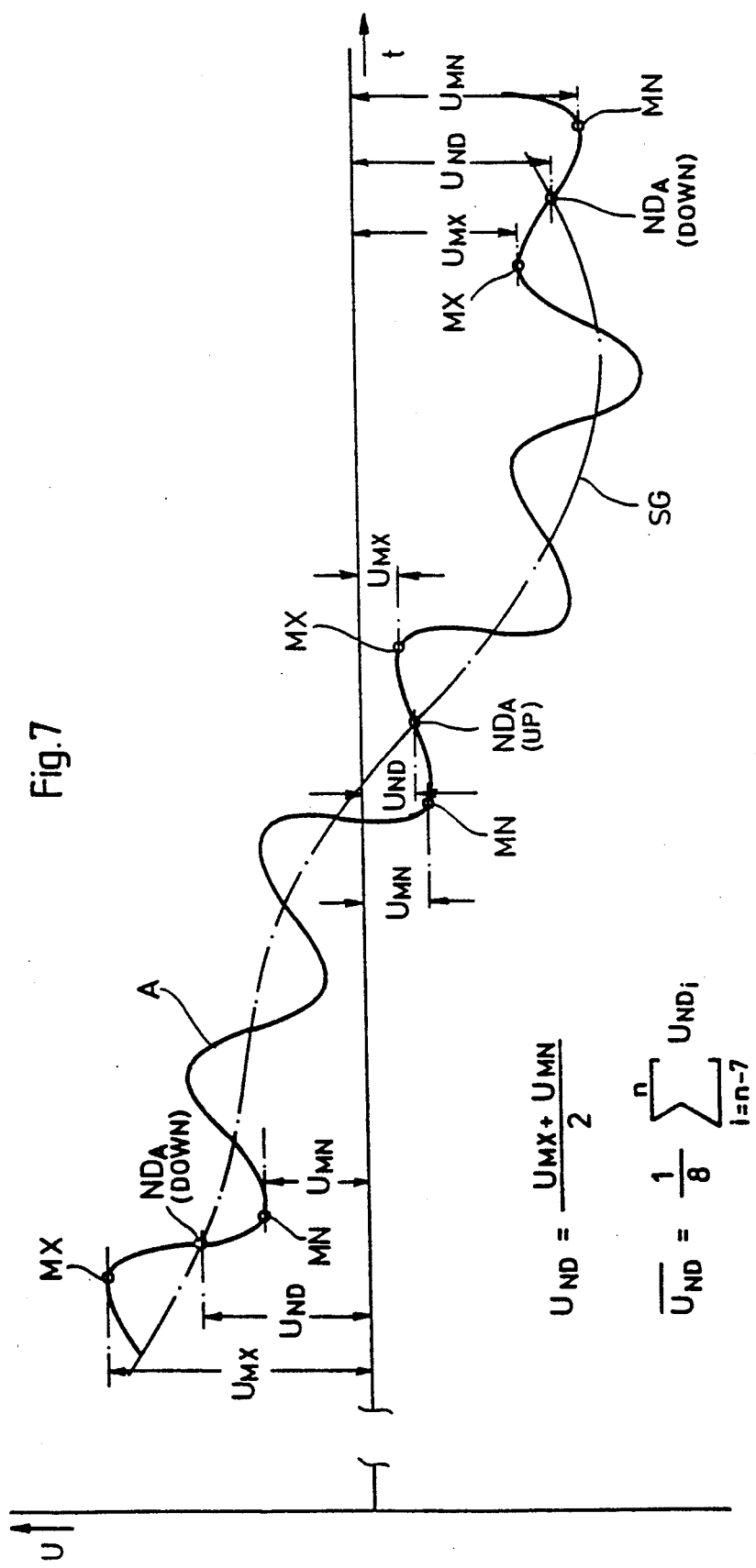

METHOD FOR MEASURING A LENGTH AND ELECTRONIC SLIDE CALIPER

The present invention relates to a method for measuring a length by means of an electronic slide caliper comprising a rule and slide arranged on the said rule for longitudinal displacement, a marking which is provided on the rule and which comprises longitudinal marks disposed periodically in the longitudinal direction in a grid pattern, and comprising further at least two sensors arranged on the slide and responding to the marking, the said sensors being offset relative to each other by a certain amount which is not equal to n times half the grid pitch sand which is a whole number so that when the slide is displaced along the rule periodic signals generated by the sensors are shifted in phase relative to each other, and comprising further switching means for adding and/or subtracting the pulses derived from the signals as a function of the sign of the phase shift.

The invention further relates to an electronic slide caliper of the type described above.

A method and slide caliper of the before-mentioned kind have been known from U.S. Pat. No. 4.226.024.

In the case of the known slide caliper, the rule is provided with ferromagnetic longitudinal marks disposed over the length of the rule in equidistant distribution. The slide is provided with two magnetoresistive sensors which are offset in longitudinal direction by an amount equal to $2 n\pi + \pi/2$, $2\pi$ being the grid pitch of the longitudinal marks. When the slide is displaced along the rule, the two magnetoresistive sensors generate substantially sinoidal signals which are shifted in phase relative to each other just by $\pi/2$. Depending on the direction in which the slide is displaced along the rule, the phase shift is positive or negative.

In the case of the known slide caliper, the signals generated by the magnetoresistive sensors are at first amplified and then passed across threshold module in order to transform the sinoidal signals into pulse-shaped signals. The pulses are then counted by a calculator, which is arranged down-stream of the threshold module and which is not described in more detail, the counting direction being dependent on the relative phase position of the signals of the magnetoresistive sensors.

It is a disadvantage of the known method and the known slide caliper that processing of the sensor signals gets increasingly prone to errors when DC signals are superimposed upon the sensor signals as drift signals or generally as disturbing signals. In addition, no precautions have been taken in the case of the known method and the known slide caliper to cope with the situation when the slide is displaced along the rule so quickly that additional dynamic errors occur.

Now, it is the object of the present invention to improve the method and the caliper slide of the type described above in such a way that safe and reliable processing of the sensor signals is possible even in the presence of strong DC signals, or signals of low frequency, and that even high speeds of displacement of the slide on the rule will not give rise to measuring errors.

Starting out from the method described at the outset, this object is achieved according to the invention by the process steps of:

Scanning periodically at least one of the signals at a predetermined scanning rate;
storing the scanned signal values;
comparing successive signal values;
generating a first characteristic value for a rise and a second characteristic value for a decrease between the successive signal values;
storing at any time the last but one signal value as maximum, for a transition from the first characteristic value to the second characteristic value, or as minimum, for a transition from the second characteristic value to the first characteristic value;
deriving the arithmetic mean value from successive maximum signal values and minimum signal values;
storing the mean values as zero-potential values;
comparing the signal values with the respective zero-potential value;
generating a third characteristic value for signal values which are above the zero-potential value, and a fourth characteristic value for signal values which are below the zero-potential value;
storing at any time the last signal value as zero passage, for a transition between the third characteristic value and the fourth characteristic value; and
counting the number of zero passages.

Starting out from the slide caliper described at the outset, the object underlying the present invention is solved by the invention by the fact that the switching means comprise:

First means for scanning periodically at least one of the signals at a predetermined scanning rate;
second means for storing the scanned signal values;
third means for comparing successive signal values;
fourth means for generating a first characteristic value for a rise and second characteristic value for a decrease between the successive signal values;
fifth means for storing at any time the last but one signal value as maximum, for a transition from the first characteristic value to the second characteristic value, or as minimum, for a transition from the second characteristic value to the first characteristic value;
sixth means for deriving the arithmetic mean value from successive maximum signal values and minimum signal values;
seventh means for storing the mean values as zero-potential values;
eighth means for comparing the signal values with the respective zero-potential value;
ninth means for generating a third characteristic value for signal values which are above the zero-potential value, and a fourth characteristic value for signal values which are below the zero-potential value;
tenth means for storing at any time the last signal value as zero passage, for a transition between the third characteristic value and the fourth characteristic value; and
eleventh means for counting the number of zero passages.

The object underlying the invention is solved in this manner fully and perfectly, firstly because by scanning the signals periodically at a high scanning rate the signals of the sensors can be detected in an reliable way. Due to the fact that the zero passages are derived directly from the maximum and minimum values of the signals measured, DC components or similar components are no longer critical because maximum and minimum values of the signals measured will always stand out characteristically, and this even if DC drifts or other disturbing quasi-stationary signals should be superimposed upon the measuring signal proper. On the other hand, it would not be possible in the presence of such distrubed measuring conditions to record the zero passages directly in a reliable way.

In order to enable even short-time disturbances to be averaged out, it is further possible, according to an advantageous further improvement of the invention, to subject the zero-potential values as such to a time-averaging step.

According to a preferred further development of the method according to the invention, a zero passage is detected when the value recorded on transition between the third characteristic value and the fourth characteristic value is lower or higher than the zero-potential value by a predetermined minimum value.

To provide a hysteresis in this manner provides the advantage that possible short-time variations are averaged out and a zero passage is recorded only when the value recorded at any time is notably above or below the zero-potential value valid from time to time.

According to other particularly preferred embodiments of the method according to the invention, both signals are scanned using the same scanning rate, and the direction of counting the number of zero passages of one of the signals is set as a function of the first or the second characteristic value, respectively, of that value of the one signal which corresponds to the zero passage. The counting direction then depends alternatively either on the third or on the fourth characteristic value of that signal value which is recorded by the sensor of the other signal simultaneously with the zero passage of the one signal, or on the first or second characteristic value of the zero passage of the other signal which precedes that zero passage.

In both cases, the direction of movement of the slide on the scale can be detected reliably, and this directional detection can be made use of for every zero passage of each of the signals. This provides a total of four measuring points and/or counting points per grid pitch so that the resolution of the longitudinal measurement is equal to one fourth of the grid pitch.

According to another particularly preferred group of embodiments of the method according to the invention, the signals are scanned offset in time by the switching time of the switching means, and when zero passages are detected in both signals in two scanning operations, which are separated only by the switching time, the common zero passage is counted twice.

This feature provides the advantage, on the one hand, that the greatest part of the electronic switching means has to be provided only once, the two signals being scanned successively using the same switching means. Now, the switching time between the two scanning operations, which is due to technical reasons and which is a constant, may lead to errors because the influence of the switching time on the determination of the phase shift between the two signals gets the more disturbing the more rapidly the slide moves along the rule. In the extreme case, it may even happen, due to the finite switching time, that the zero passages of the two signals coincide or come to lie in the same time window, as determined by the scanning rate. In order to avoid faulty counts in this case, it is provided according to the before-mentioned embodiment of the invention that the respective count is counted twice.

A particularly good effect is achieved in this case in particular when the counting direction is locked once a double zero passage has been detected as mentioned before.

This feature provides the advantage that the processing time in the switching means can be reduced because it is now only necessary to detect the zero passages, without having to determine the counting direction in addition. Errors cannot occur in this case as in the presence of high speeds of displacement of the slide along the rule, it is extremely improbable, for physical reasons, that the direction of movement of the slide along the rule should be reversed since any such reversal of the direction of movement would require an extreme peak acceleration and, thus, very high actuating forces. Consequently, as long as the high speed of displacement of the slide along the rule continues, it is sufficient to record only the zero passages and to continue counting in the counting direction determined last.

According to another embodiment of the invention, this condition may be terminated upon detection of another double zero passage which can be interpreted as a criterion indicating that the speed of displacement of the slide along the rule has dropped to a lower value with the consequence that it now becomes necessary again to determine the counting direction separately for each zero passage.

Other advantages of the invention will appear from the specification and the attached drawing.

It is understood that the features that have been described before and will be explained hereafter may be used not only in the described combinations, but also in any other combination, or individually, without leaving the scope and intent of the present invention.

Certain embodiments of the invention will now be described in more detail with reference to the drawing in which:

FIGS. 3 to 6 show typical evolutions of measuring signals illustrating different operating conditions of the slide caliper;

FIG. 7 shows a representation of a measuring signal, in the presence of disturbing signals;

Figure 1:
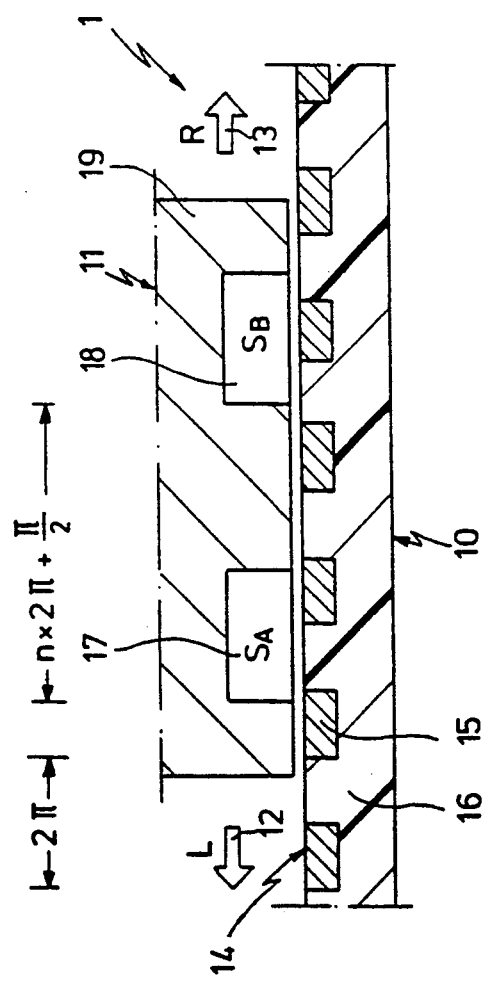
FIG. 1 shows, in greatly enlarged scale, a cross-sectional view, taken in the longitudinal direction, of the rule and the slide of a slide caliper according to the invention, which may be employed for carrying out the method according to the invention.

Regarding now FIG. 1, one can see a cross-sectional representation, in greatly enlarged scale as compared to the real dimensions, of part of a slide caliper 1. The sectional view of FIG. 1 has been taken along the longitudinal direction of a rod 10 and a slide 11 of an electronic slide caliper of the type known generally from U.S. Pat. No. 4,226,024. For more details, reference is made to that publication.

The slide 11 is arranged to slide on the rule 10 in the longitudinal direction, as indicated in FIG. 1 by arrow 12 for the movement to the left (L) and by arrow 13 for the movement to the right (R).

The rule 10 carries a marking 14 comprising marks 15 which consist of a ferromagnetic material and which are distributed at equidistant spacings. The marks 15 may have the form of the rungs of a ladder-shaped structure, embedded in a non-magnetic material 16 of the rule 10.

The slide 11 on its turn carries sensors 17, 18. In FIG. 1, the left sensor 17 is indicated by $S_A$, which is meant to indicate that the sensor 17 or $S_A$ generates a signal A, while the right sensor 18 in FIG. 1 is indicated by $S_B$ in order to indicate that this sensor generates a signal B.

The sensors 17, 18 are likewise embedded in a non-magnetic material 19 inside the slide 11. The sensors 17, 18 may be designed as inductive sensors, Hall sensors, magneto-resistive sensors, or the like.

It should be noted in this connection that the field-sensitive sensors 17, 18 indicated in FIG. 1 are to be understood as an example only, it being without any importance for the invention whether field sensitive sensors, capacitive sensors, optical sensors or other length-measuring systems are employed.

What matters in the present connection is the fact that the sensors 17, 18 must be offset in the longitudinal direction by a certain amount. This amount must be determined in such a way that the signals A, B, which are generated by the sensors 17, 18 as the slide 11 is displaced along the rule 10 and which have an approximately sinoidal curve, will not coincide in their zero positions. As this would be the case at 0° or 180° or a multiple of 180°, it is preferred to arrange the sensors 17, 18 in such a way that the signals A, B generated by them are shifted in phase by 90°, as is known as such.

If the grid pitch of the marks 15 of the marking 14 is defined by $2\pi$, then the longitudinal distance between the sensors 17, 18 may be equal, for example, to $n.2\pi + \pi/2$, as indicated in FIG. 1.

Figure 2:
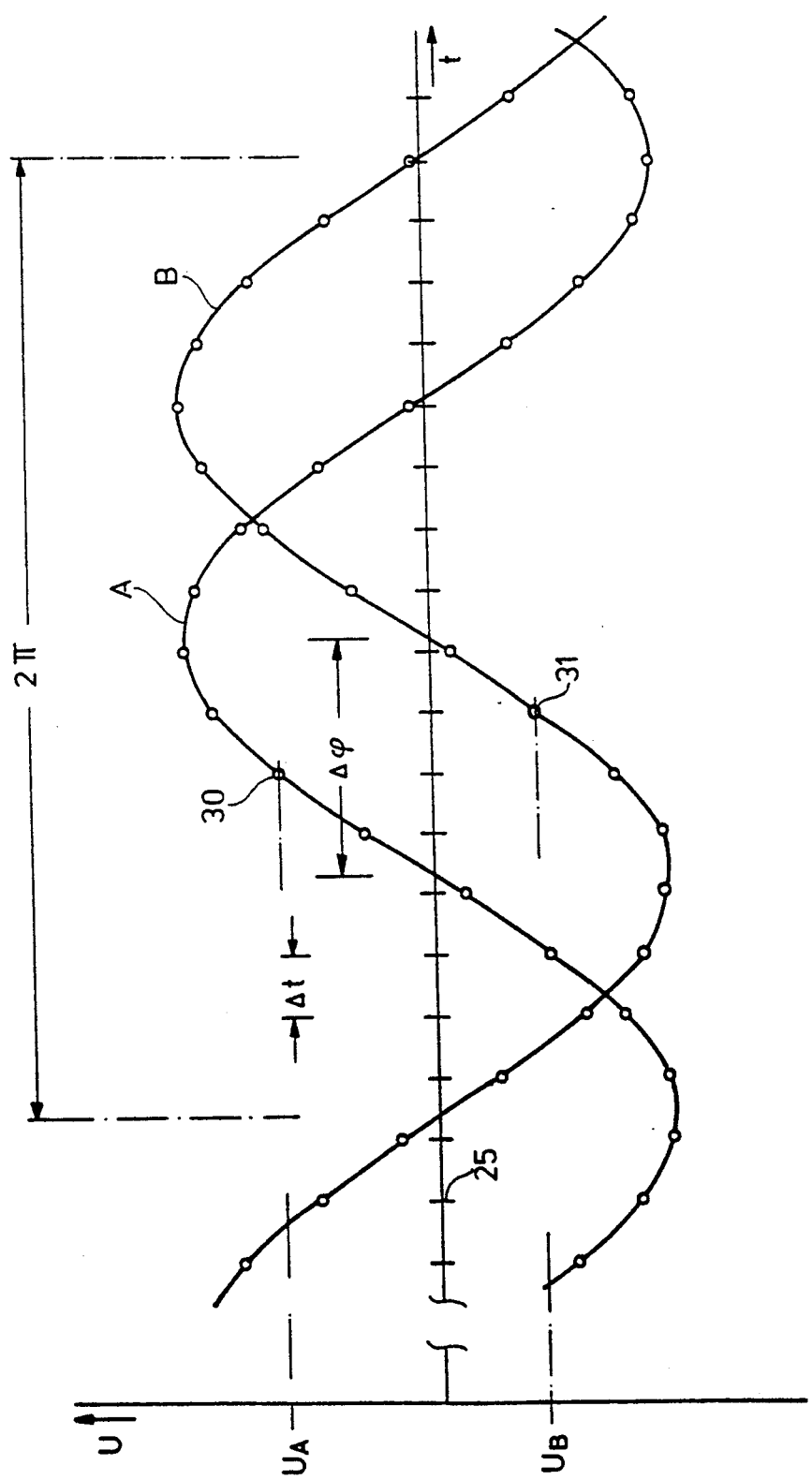
FIG. 2 illustrates measuring signals as typically produced with the aid of the arrangement according to FIG. 1.

If in the arrangement illustrated in FIG. 1 the slide 11 is now moved along the rule 10 at normal speed, the sensors 17, 18 generate signals A and B as illustrated in FIG. 2.

It will be readily appreciated that the signals A and B have a substantially sinoidal curve and that their electric period is equal to the amount $2\pi$. As has been mentioned before, the phase shift is 90°, although this must not necessarily be so since in principle values other than 90° would also be possible, so long as the phase shift $\Delta\phi$ is not equal to 0°, 180° or a multiple thereof.

In FIG. 2, reference numeral 25 indicates time marks which are meant to symbolize a periodic scanning process. The scanning rate, i.e. the time interval between the time marks 25 is equal to $\Delta t$.

For a practical example of the invention, the geometrical grid pitch $2\pi$ of the marking 14 may be 1 mm, for example. When the slide 11 is now moved along the rule 10, at a speed of 0.1 m/s, this results in a frequency of 100 Hz for the signals A and B, or in a value of 10 m/s for the electric period of $2\pi$. If, in contrast, the slide 11 is moved along the rule 10 at a higher speed, for example at a speed of 1 m/s, one obtains a signal frequency of 1 kHz and a period of 1 m/s.

If, in the last-mentioned case, one wishes to have a sufficiently great number of scanning points, then a scanning rate of 4 800 per second, for example, may be selected, which would correspond to a scanning time $\Delta t$ of approx. 0.2 ms.

By scanning the signals A, B periodically in the described manner, measuring points are defined on the said signals, one of them being indicated by 30 for the signal A, another one being indicated by 31 for the signal B in FIG. 2. Each measuring point 30, 31 stands for a particular signal value, i.e. the measuring point 30 for a potential $U_A$ and the measuring point 31 for $U_B$.

Consequently, when scanning the signals A and B periodically, the corresponding signal values $U_A$ and $U_B$ are picked up and recorded for each of the measuring points 30, 31.

FIGS. 3 to 6 now show different signal curves for different operating conditions of the slide caliper 1.

FIG. 3 illustrates the case where the slide 11 is displaced along the rule 10 in the direction of arrow 30, i.e. to the right (R). The signal A is now positioned at the left of signal B in the time diagram, shifted in phase by the before-mentioned 90°.

In FIG. 3, the zero passages of the signals A and B are defined by $ND_A$ and $ND_B$, respectively. The direction of the zero passage, i.e. the gradient of the signal curves, is indicated by the additional symbols UP for positive slope, and DOWN for negative slope. In addition, positive signal values are indicated by the symbol (+), negative signal values by the symbol (−).

If one now regards FIG. 3, and there in particular the positive-slope (UP) zero passage $ND_A$ of the signal A, it can be stated as an additional criterion for this case, namely the displacement of the slide 11 to the right (R) along the rule 10, that the signal B must have a negative signal value (−) B at the time of this zero passage $ND_A$ (UP), or that the preceding zero passage $ND_B$ (DOWN) of the signal B must have had a negative slope.

Correspondingly, it can be said for a positive-slope zero passage $ND_B$ (UP) of the signal B that a simultaneous positive signal value (+) A of the signal A, or a preceding positive-slope zero passage $ND_A$ (UP) of the other signal A is an indication of a displacement to the right (R).

FIG. 4 shows the corresponding case for positive-slope zero passages of the signals A and B, when the slide 11 has been displaced along the rule 10 to the left (L).

For $ND_A$ (UP) it can be said that the direction of displacement is (L) when a positive slope is determined, either simultaneously with $ND_A$ (UP) for a positive signal value (+) B of the other signal B, or for the preceding zero passage $ND_B$ (UP) of the latter. For the case of the zero passage $ND_B$ (UP) of the B signal it can be said that the direction of displacement is (L) when either the value (−) A of the other signal A is negative at the same time or the preceding zero passage $ND_A$ (DOWN) of the other signal A had a negative slope.

FIGS. 5 and 6 illustrate the corresponding cases for negative-slope zero passages $ND_A$ (DOWN) and $ND_B$ (DOWN) of the signals A and B. FIGS. 5 and 6 also illustrate the respective additional conditions for the other signal, for the directions of displacement (R) and (L), respectively.

FIG. 7 shows again a practical example of the evolution over time of the signal A, but this time in the presence of a disturbance (SG). For the present purposes, the disturbance SG is assumed to be a quasi-stationary quantity, i.e. a quantity similar to a DC voltage which drifts at a very low frequency. Such disturbances SG may be caused, for example, by temperature drifts, pressure influences, humidity influences, or the like.

If one now regards FIG. 7, one realizes that it is rather difficult to define a reference potential relative to the abscissa of the diagram in FIG. 7.

Now, in order to be able to determine the zero passages $ND_A$ in spite of the presence of the disturbance SG, one proceeds as follows:

If one regards the representation of FIG. 7, one readily recognizes that the predominant points of the signal curve are their extreme values, rather than their zero passages. For the purposes of the present description, the signal maxima will be identified hereafter by MX, the signal minima by MN, and the relevant signal voltages will be identified by $U_{MX}$ and $U_{MN}$, respectively.

If one now determines the maxima MX and the minima MN in the manner which will be described in more detail below, by reference to FIG. 8, then a signal voltage $U_{ND}$ can be determined for the zero passage $ND_A$ from the relevant signal voltages $U_{MX}$ and $U_{MN}$, by forming the arithmetic mean value thereof. Although, depending on the behavior of the disturbance SG, this arithmetic mean value may not be the exact zero passage, it can still be regarded as a sufficiently good approximation for the purposes of the present applications.

Another possibility of averaging short-time disturbing influences consists in this connection in taking again the average of the detected signal values $U_{ND}$ for the zero passages $ND_A$, but this time on a time basis. It is thus possible, for example, to take the arithmetic average of the eight last signal values $\overline{U_{ND}}$, in order to obtain in this manner a fictitious mean signal value as zero-potential value $U_{ND}$ to which the respective signal curve is then related.

Figure 8:
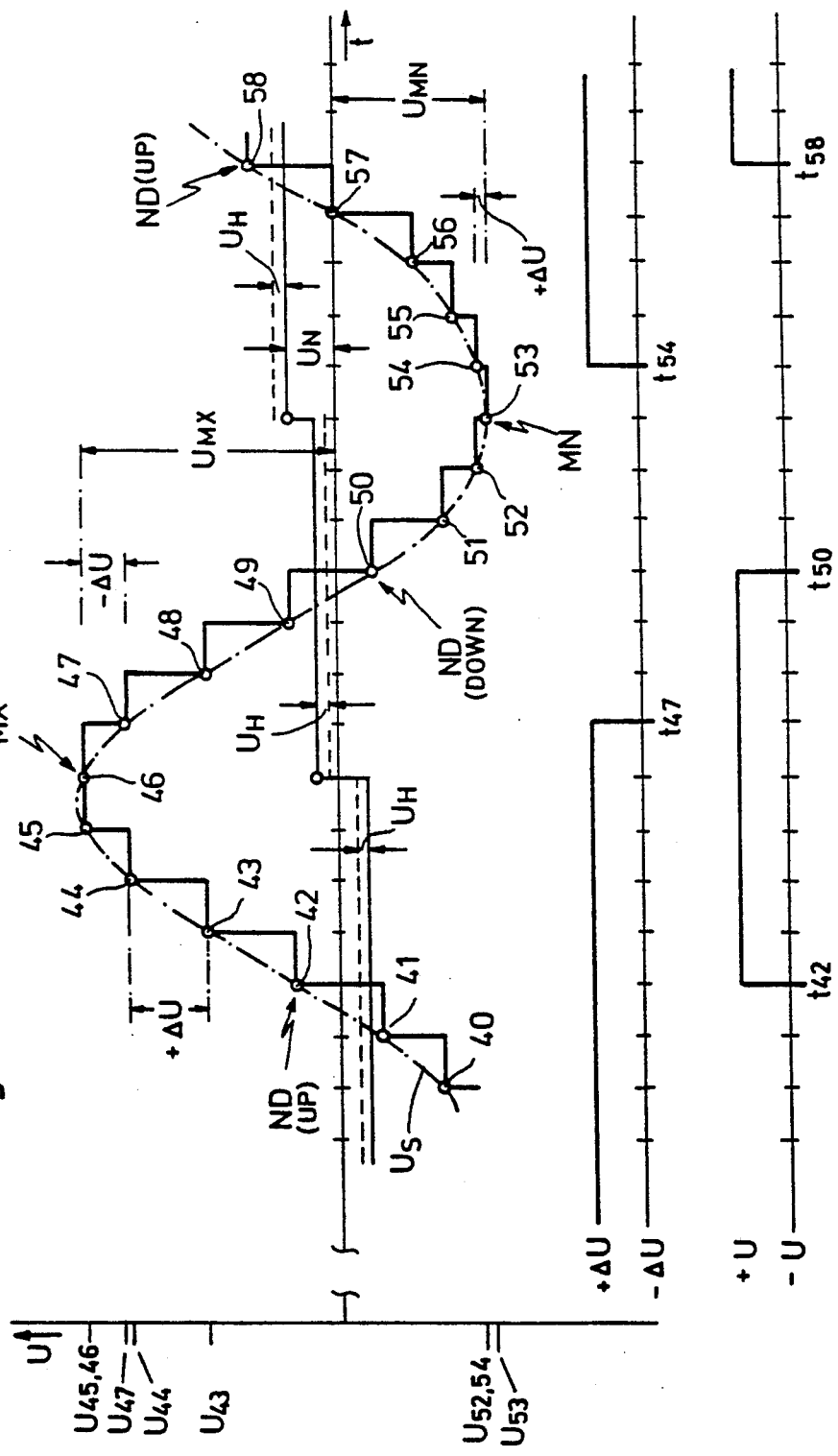
FIG. 8 shows an enlarged detail of the representation of FIG. 7, illustrating the determination of characteristic values and of characteristic points of the measuring signals.

FIG. 8 shows in this connection a detail of the representation of FIG. 7, in enlarged scale.

The curve trace illustrated in FIG. 8 comprises a total of 19 measuring points 40 to 58. The real signal voltage $U_S$ is indicated by a dash-dotted line which connects the measuring points 50 to 58.

Given the fact that the signal voltage $U_S$ is scanned in all measuring points 40 to 58, and is stored, the signal curve which is built up in a storage of the slide caliper has the approximate shape of a staircase function, as illustrated in FIG. 8.

In order to determine the extreme values MX and MN, the system now checks if the signal voltage $U_S$ has increased or dropped between the preceding measuring point and the active measuring point. This can be effected in a simple way by comparing the signal voltages $U_S$ of the two measuring points. If the signal is found to have increased, a first characteristic value $+\Delta U$ is generated, while in the case of a signal drop a second characteristic value $-\Delta U$ is generated. It is well possible in this connection to allow for a switching hysteresis, for example by detecting a signal rise only when the signal has risen by more than a predetermined minimum value.

As can be seen best in FIG. 8, the first characteristic value $+\Delta U$ prevails up to the measuring point 47; then a transition occurs to the second characteristic value $-\Delta U$ whereafter the signal continues to drop down to the measuring point 54 where the signal starts to rise again at rates corresponding to the first characteristic value $+\Delta U$.

The moments of transition between the first characteristic value $+\Delta U$ and the second characteristic value $-\Delta U$ are indicated in FIG. 8 by $t_{47}$ and $t_{54}$.

The present method now detects the transition at the moments $t_{47}$ and $t_{54}$, and stores in each case the last but one measuring point, i.e. in the illustrated example the measuring point 46 and 53, as extreme values, 46 being stored as the maximum MX and 53 being stored as the maximum MN.

Occasionally, the measuring variation may "jitter" within a period; this may happen when disturbances of higher frequencies are superimposed on the relatively low-frequency measuring signal. If in this case every momentary maximum value and minimum value were detected as minimum or maximum, one would, therefore, determine fictitious maxima and fictitious minima. In order to avoid this, one may store all maximum values and minimum values detected, and determine thereafter as maximum the highest maximum value determined during a signal period of the basic signal, and correspondingly as minimum the lowest minimum value determined during the same signal period.

According to the rule discussed in connection with FIG. 7, one can now derive an arithmetic mean value from the relevant signal voltages $U_{46}$ and $U_{53}$, and the mean value so determined can then be translated into the zero-potential signal $U_N$ either directly or by forming the average from that value and preceding mean values.

As this operation can be repeated following each newly determined extreme value MX or MN, this means that the momentary zero-potential value $U_N$ can be adjusted every time a new extreme value MX or MN occurs, as is indicated clearly by the staircase curve of FIG. 8. The zero-potential value $U_N$ so adjusted then remains valid until a new zero-potential value $U_N$ is detected at the time of occurrence of the next extreme value MX or MN, and until the corresponding adjustment has been carried out.

In order to determine the measuring point which is to be valid for further processing of the zero passage ND, one further checks if the signal voltages $U_S$ of each of the measuring values 40 to 58 determined are higher or lower than the valid zero-potential values $U_N$.

The result of this check is identified by the third characteristic value $+U$ or $-U$, respectively.

Regarding now again the curve of FIG. 8, it will be readily seen that the signal $U_S$ for the measuring points 40 and 41 is still lower than the zero-potential signal $U_N$ valid at these measuring points, while the measuring signal $U_S$ of the measuring point 42 is already higher than the zero-potential signal $U_N$. The same applies for the other measuring points 43 to 49, whereas for the subsequent measuring point 50 to 57 the fourth characteristic value $-U$ is produced again, and the third characteristic value $+U$ prevails as from the measuring point 58.

For the purposes of the present method, the moments when the measuring signal rises above or drops below the zero-potential signal $U_N$ for the first time are detected as zero-passage ND. In the case of the example illustrated in FIG. 8, this occurs at the moments $t_{42}$, $t_{50}$ and $t_{58}$.

If one now combines the transitions between the third characteristic value $+U$ and the fourth characteristic value $-U$, i.e. the occurrence of zero passages ND with the first characteristic value $+\Delta U$ or the second characteristic value $-\Delta U$ prevailing at these points, it is also possible to determine the direction of the zero passage as UP or DOWN.

In the case of the example illustrated in FIG. 8 it will be noted that a zero passage occurs at the measuring point 42 (transition between the third characteristic value $+U$ and the fourth characteristic value $-U$) and that a first characteristic value $+\Delta U$ is indicated at that moment. Consequently, the direction of the zero passage ND is UP at the measuring point 42. Correspondingly, it can be said for the second zero passage occurring at the moment $t_{50}$ that the second characteristic value $-\Delta U$ prevails so that the direction is DOWN in this case. As regards the third zero passage at the measuring point 58 illustrated in FIG. 8, the prevailing characteristic value is again the first characteristic value $+\Delta U$ so that the direction of this zero passage can be identified again by UP.

It will be further seen in FIG. 8 that, in view of improving the measuring safety, the zero-potential signal $U_N$ is further increased or reduced, respectively, by a hysteresis potential $U_H$, in order to avoid the measuring values from fluctuating about the zero-potential signal. These hysteresis potential $U_H$ is polarized in each case in such a way that the signal potential $U_S$ must exceed both the zero-potential signal $U_N$ and additionally the hysteresis potential $U_H$ if a zero passage ND is to be detected.

Figure 9:
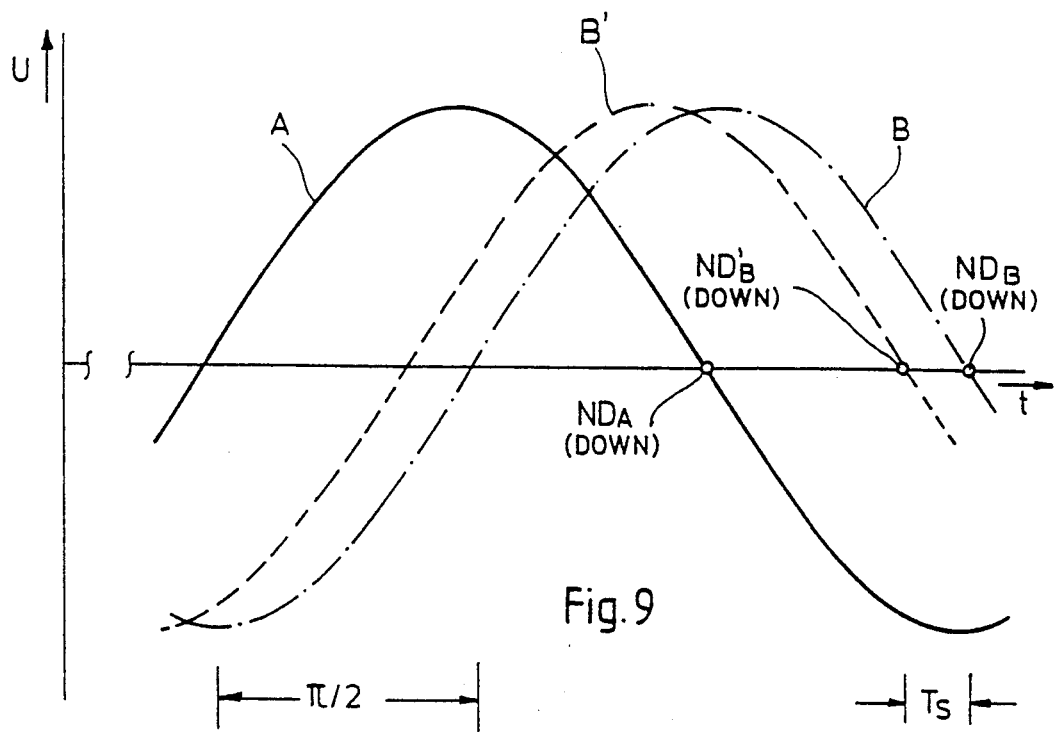
FIGS. 9 and 10 show representations illustrating the influence which the speed of displacement of the slide along the rule has in the case of a slide caliper according to the invention.

FIG. 9 shows once more the signal curves A and B, at the time scale of FIG. 8.

This figure shows additionally the switching time $T_S$. The switching time has to be considered because for reasons of economy it is desirable to have the signal scanning and processing operations, which have been discussed in connection with FIG. 8, effected by the same switching means for both signals A and B. This requires, however, that the two signals A and B must be scanned and processed one after the other. This gives rise to a slight incongruence in time between the two processes, which is characterized by the switching time $T_S$ in FIG. 9. The importance of the switching time $T_S$ results from the fact that it is a constant so that it may lead to a systematic error in the determination of the relative phase position of the signals A and B. The quantity of this phase error depends of course on the frequency of the signals A and B and, thus, on the speed of displacement of the slide 11 along the rule 10, the switching time $T_S$ having the effect of a time lag.

FIG. 9 now illustrates the case where the slide 11 is displaced along the rule 10 at relatively low speed. The development of the one signal is indicated by A, that of the other signal by B, the dash-dotted representation of B representing the theoretical position of this signal curve, relative to the signal A. Due to the before-mentioned switching time $T_S$, however, the detected curve of the signal B has to be recorded as illustrated by the curve B', $T_S$ characterizing exactly the phase shift between the theoretical signal B and the real signal B' as measured.

For the purposes of the present signal evaluation this means that the zero passage $ND_B$ (DOWN) of the B signal is displaced to the left in FIG. 9, into a position $ND_{B'}$ (DOWN), i.e. that this zero passage gets closer to the zero passage $ND_A$ (DOWN) of the signal A.

This is not critical by itself, since this displacement does not yet lead to changes in the operating cases illustrated in FIGS. 3 to 6, or to the criteria for determining the sense of displacement, as discussed in this connection. From the technical point of view, this results from the fact that the switching time $T_S$ is still substantially smaller in the case illustrated in FIG. 9 than the basic phase shift $\pi/2$ between the signals A and B.

Figure 10:
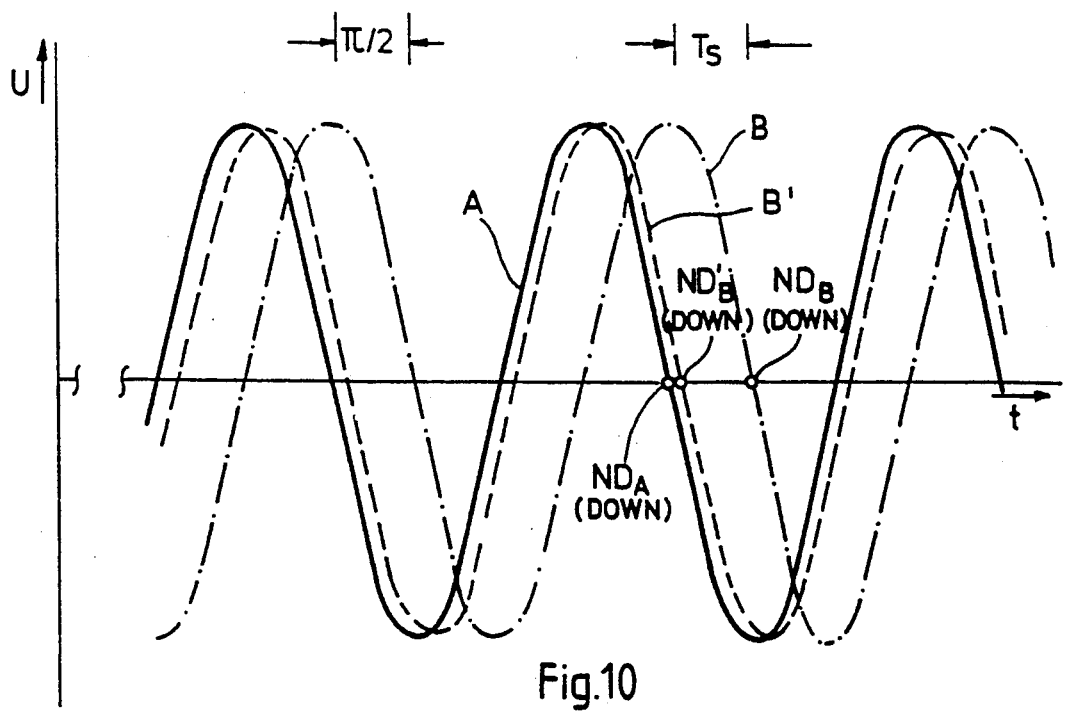

However, when the speed of displacement of the slide 11 along the rule 10 increases, the conditions illustrated in FIG. 10 occur, and it can be noted that now the switching time $T_S$ is in the same order of magnitude as the basic phase shift $\pi/2$. The real, measured zero passage $ND_{B'}$ (DOWN) of the B' signal has now moved very close to the zero passage $ND_A$ (DOWN) of the A signal.

FIG. 10, therefore, marks the transition to a condition which does no longer allow to detect the direction with the aid of the criteria described heretofore since, if the speed of displacement of the slide 11 along the rule 10 were further increased beyond the speed illustrated in FIG. 10, the zero passage $ND_{B'}$ (DOWN) would continue to move to the left and even move past the zero passage $ND_A$ (DOWN) of the one signal A. Then the criteria developed heretofore in connection with FIGS. 3 to 6 for the detection of the direction of displacement of the slide 11 along the rule 10 would no longer be valid.

In order to exclude any such errors, the present invention proposes to detect any coincidence of the zero passages $ND_A$ and $ND_{B'}$ in a measuring window, i.e. within a period t. When such a coincidence occurs, this is taken as a criterion indicating that a predetermined upper speed value of the displacement of the slide 11 along the rule 10 has been attained. Such a detection has the following dual effect:

On the one hand, a double count is effected in the time window $\Delta t$, as in effect two zero passages were detected in that time window $\Delta t$. On the other hand, once this condition has occurred, one stops detecting the direction, i.e. the criteria for the detection of the sense of displacement, as developed according to FIGS. 3 to 6, are no longer applied. Instead, one continues to count in the direction valid at the moment when the coincidence of the zero passages $ND_A$ and $ND_B$ was detected.

From the physical point of view, it is in fact quite safe to do without a separate detection of the counting direction after the stated point in time. For, if the slide 11 is moved along the rule 10 at that high speed, it is extremely improbable that a reversal in the sense of movement should occur at that high speed, due to the reversal in acceleration connected therewith and the high forces required for this purpose. Due to physical reasons it is, therefore, safe to assume that once the high speed value of the displacement has been reached, the sense of displacement will be maintained until the speed drops again below the speed threshold value. However, this can be detected in just the same manner as has been described before, in order to switch back to the original operating mode once the second coincidence of the zero passages $ND_A$ and $ND_B$ has been detected, from which time on the sense of displacement is determined simultaneously with each zero passage.

The theory described above applies to the case of asynchronous scanning, i.e. to the case where the two measuring channels are connected to a single-channel scanning device whose input is connected alternately to the two measuring channels which fact, due to the finite switching time, gives rise to the errors that have been discussed at some length before.

If instead of the arrangement described before synchronous signal scanning is used, in which case each measuring channel has assigned to it a separate scanning unit, then it is possible in principle to suppress the described error as there do not occur any switching times in this case. On the other hand, this does not mean, however, that there will not occur in this case any coincidence of zero passages within a measuring window.

This effect may indeed occur also when synchronous scanning is employed, though of course only at very much higher frequencies, i.e. much higher speeds of displacement of the slide along the rule. Consequently, the procedure described in the context of the present invention can be employed also in connection with the synchronous operating mode, in order to eliminate the errors which occur only at higher frequencies.

Figure 11:
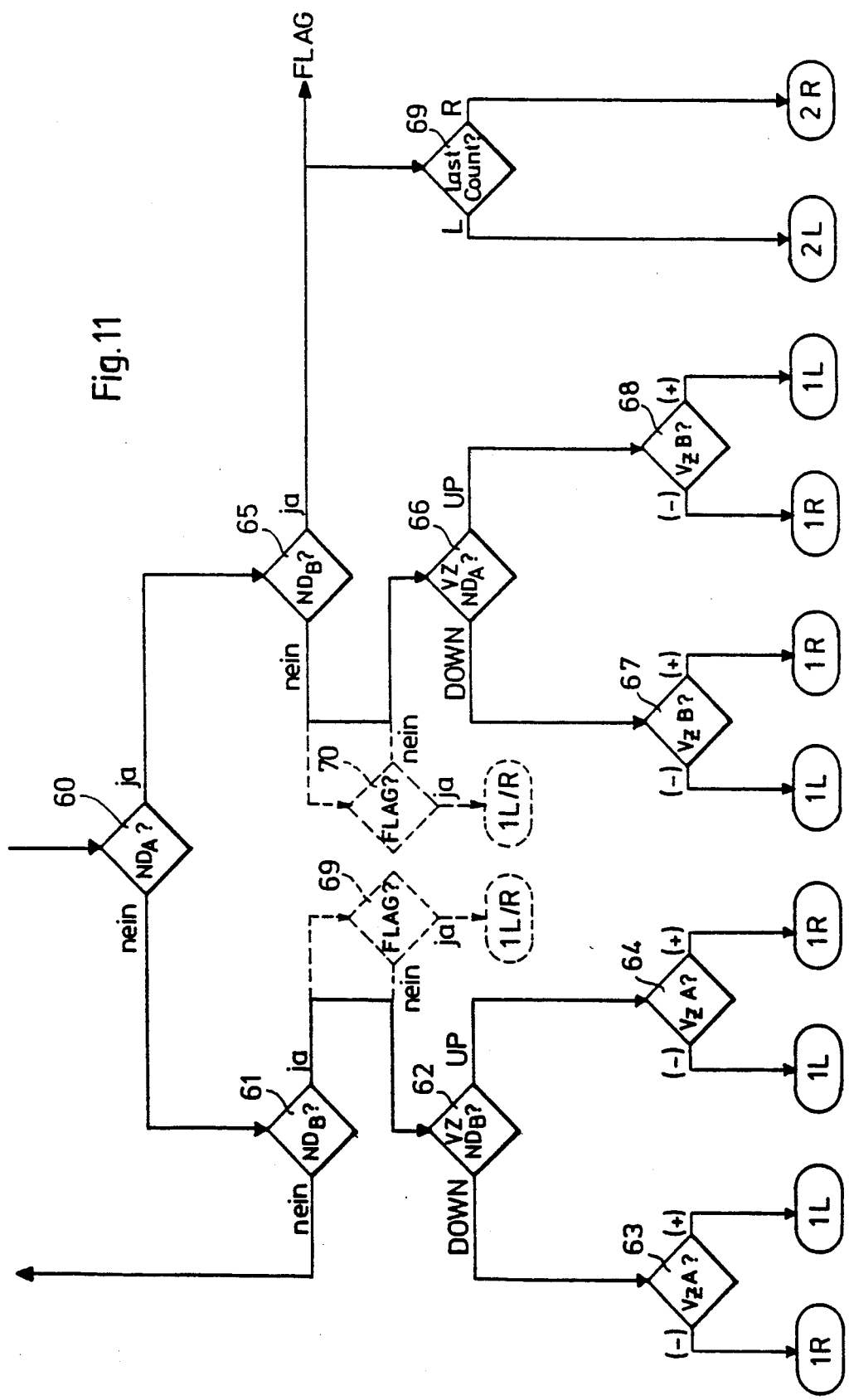
FIGS. 11 and 12 show two flow diagrams illustrating two variants of the method according to the invention.
Figure 12:
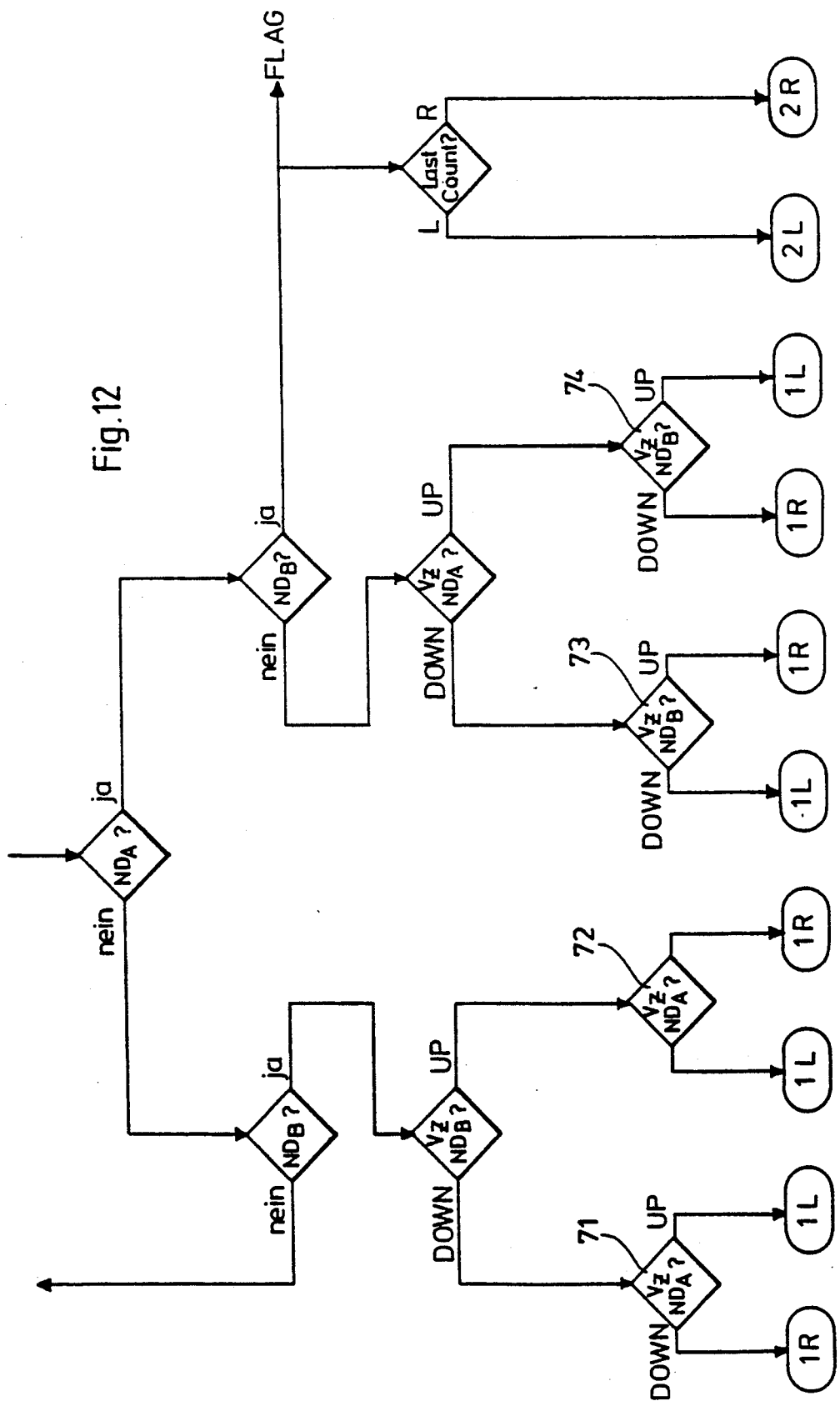

FIGS. 11 and 12 illustrate once more two variants of the above procedure in the form of flow diagrams.

Reference numeral 60 in FIG. 11 stands for a decision block which serves to determine for each recorded measuring value (for example the measuring values of the measuring points 40 to 58 in FIG. 8) if there is a zero passage in the signal A, judging by the criteria discussed in connection with FIG. 8.

If this is not the case, the system inquires in the decision block 61 if there is a zero passage at that moment in the parallel channel of the signal B. If this is not the case, either, no steps are taken at all, and the system proceeds to the next measuring points. If, however, it was detected in the decision block 61 that whilst there was no zero passage $ND_A$ of the A signal, there was a zero passage $ND_B$ of the B signal, the system proceeds to the next decision block 62 which determines if the zero passage $ND_B$ encountered has a negative (DOWN) or a positive (UP) slope, as has been discussed in detail in connection with FIG. 8.

If the slope is negative (DOWN), a further decision block 63 then checks if the polarity or the sign $V_Z$ of the parallel signal A was positive or negative at the moment the zero passage $ND_B$ just determined occurred. This is done simply by enquiring for the third characteristic value $+U$ or the fourth characteristic value $-U$. If it is found that at the moment in question the signal A was of negative polarity relative to the zero-potential signal $U_N$, this is interpreted as a displacement to the right (R) and the displacement counter is advanced by one step in that direction. If the signal A was of positive polarity, the counter records a step in the left direction (L).

The same proceeds analogously in a decision block 64 if a positive slope (UP) was determined for the detected zero passage $ND_B$.

In the event a zero passage $ND_A$ has been detected in the A signal already in the first decision block 60, it is then inquired in a further decision block 65 whether there is a simultaneous zero passage $ND_B$ in the parallel B signal.

If the answer is no, the further evaluation proceeds in the decision blocks 66 to 68 by analogy to the process discussed before for the decision block 62 to 64.

The procedure described before results in a total of eight operating conditions each of which effects a counting step in the left (L) or in the right (R) direction. These kinds of operating conditions correspond to the eight operating conditions that have been discussed further above, by reference to FIGS. 3 to 6.

It is a particularity of the decision block 65, that it is additionally capable of detecting the case discussed before in connection with FIGS. 9 and 10, namely that it is capable of detecting a simultaneous occurrence of zero passages $ND_A$ and $ND_B$ in both signals A and B, i.e. a coincidence of these two zero passages $ND_A$ and $ND_B$.

This is achieved on the one hand by setting a FLAG and enquiring on the other hand for the direction of the preceding counting step. This is done in a further decision block 69. If it is determined that the preceding counting step was to the left (L), the counter is now advanced by two steps to the left (L), or by two steps to the right (R) if the preceding counting step was to the right (R).

The fact that the flag has been set now leads to the condition that the following counting processes are effected directly from the "Yes" output of the decision block 61, or from the "No" output of the decision block 65, it being no longer necessary, due to the high speeds of displacement of the slide 11 along the rule 10 prevailing at that time, to have the direction of displacement detected by the decision blocks 62 to 64, or 66 to 68, respectively.

In addition, setting the flag has the effect that when the next coincidence of zero passages $ND_A$ and $ND_B$ occurs, this once more causes a double count to be effected (decision block 69), while on the other hand the system switches back to normal operation with participation of the decision blocks 62 to 64, and 66 to 68.

These conditions are illustrated in FIG. 11 by two additional decision blocks 69 and 70, with the signal paths indicated by broken lines.

In contrast, FIG. 12 shows once more the variant that has been discussed further above, where the direction of the preceding zero passage ND for the other signal, rather than (decision blocks 63, 64, 67, 68 in FIG. 11) the polarity of the other signal, is taken as the last decision criterion for the sense of the displacement. According to FIG. 12, this purpose is fulfilled by additional decision blocks 71 to 74. For the rest, the operating sequence of the flow diagram according to FIG. 12 is identical to that of FIG. 1, and this also as regards the particularities relating to high displacement speeds which have been discussed in this connection.

It is understood that instead of counting the number of zero passages, it would also be possible to count other events related to the zero passage, for example the number of maxima or of minima, without leaving the scope of the present invention.

I claim:

1. A method for measuring a length by utilizing an electronic slide caliper having a rule and a slide arranged on said rule for displacement thereon in a longitudinal direction, a marking being provided on said rule, said marking comprising longitudinal marks distributed periodically in said longitudinal direction at a grid pitch, said caliper, further, comprising at least two sensors arranged on said slide and responding to said marking, said sensors being offset relative to each other by a predetermined amount ($n\pi \pm \pi/2$) unequal to n times half said grid pitch ($\pi$) with n being an integer number so that when said slide is displaced along said rule, periodic voltage signals (A, B) generated by said sensors are offset in phase ($\Delta\phi$) relative to each other, said caliper also comprising computing means for numerically processing pulses derived from said signals (A, B) as a function of the sign of said phase offset ($\Delta\phi$), the method comprising the steps of:

Scanning periodically at least one of said signals (A, B) at a predetermined scanning rate ($\Delta t$) for generating scanned signal values ($U_A$, $U_B$);

storing said scanned signal values ($U_A$, $U_B$);

comparing successive ones of said scanned signal values ($U_{40}$, $U_{58}$);

generating a first characteristic value ($+\Delta U$) upon occurrence of a rise and a second characteristic value ($-\Delta U$) upon occurrence of a decrease between said successive signal values ($U_{40}$, $U_{58}$);

storing of the respective last but one signal value ($U_{46}$, $U_{53}$) as a maximum (MX), upon occurrence of a transition from said first characteristic value ($+\Delta U$) to said second characteristic value ($-\Delta U$), and as a mimimum (MN), upon occurrence of a transition from said second characteristic value ($-\Delta U$) to said first characteristic value ($+\Delta U$);

generating an arithmetic mean value from successive maximum signal values ($U_{46}$) and minimum signal values ($U_{53}$);

storing said arithmetic mean values as zero-voltage values ($U_N$);

comparing said signal values ($U_{40}$–$U_{58}$) with said respective zero-voltage value ($U_N$);

generating a third characteristic value ($+U$) during presence of signal values ($U_{42}$–$U_{49}$, $U_{58}$) which are above said zero-voltage value ($U_N$), and a fourth characteristic value ($-U$) during presence of signal values ($U_{40}$–$U_{41}$, $U_{50}$–$U_{57}$) being below said zero-voltage value ($U_N$);

storing the respective last signal value ($U_{42}$, $U_{50}$, $U_{58}$) as a zero transition (ND), upon occurrence of a transition between said third characteristic value ($+U$) and said fourth characteristic value ($-U$); and counting the number of zero transitions (ND).

2. The method of claim 1, wherein an average zero-voltage value is derived from a plurality of successive zero-voltage values ($U_N$) and said signal values ($U_{40}$–$U_{58}$) are compared with said average zero-voltage value.

3. The method of claim 1, wherein a zero transition (ND) is detected when said zero-voltage value recorded during a transition between said third characteristic value ($+U$) and said fourth characteristic value ($-U$) is exceeded in either direction by a predetermined minimum value ($U_H$).

4. The method of claim 1, wherein both said signals (A, B) are scanned at a common scanning rate ($\Delta t$), a direction of counting the number of zero transitions ($ND_A$) of one of said signals (A) being set as a function of said first ($+\Delta U$) or said second ($-\Delta U$) characteristic value (UP, DOWN) respectively, of that value ($U_{42}$, $U_{50}$, $U_{58}$) of said one signal (A) corresponding to said zero transition ($ND_A$), and being, further, set as a function of said third ($+U$) or said fourth ($-U$) characteristic value of said signal value ($U_B$) being recorded by said sensor (18) of said other signal (B) simultaneously with said zero transition ($ND_A$) of said one signal (A).

5. The method of claim 1, wherein both said signals (A, B) are scanned at a common scanning rate ($\Delta t$), a direction of counting the number of zero transitions ($ND_A$) of one of said signals (A) being set as a function of said first ($+\Delta U$) or said second ($-\Delta U$) characteristic value (UP, DOWN), respectively, of that value ($U_{42}$, $U_{50}$, $U_{58}$) of said one signal (A) corresponding to said zero transition ($ND_A$) and being, further, set as a function of said first ($+\Delta U$) or said second ($-\Delta U$) characteristic value (UP, DOWN) of said zero transition ($ND_B$) of said other signal ($U_B$) preceding said zero transition ($ND_A$).

6. The method of claim 1, wherein said signals (A, B) are scanned offset in time by a switching time ($T_S$) of said computing means, and wherein, when zero transitions ($ND_A$, $ND_B$) are detected in both signals (A, B) in two scanning operations, being offset only by said switching time ($T_S$), such joint zero transition ($ND_A$, $ND_B$) is counted twice.

7. The method of claim 6, wherein said counting direction is locked when zero transitions ($ND_A$, $ND_B$) are detected in both signals (A, B) in two scanning operations, separated only by said switching time ($T_S$).

8. The method of claim 7, wherein said locking is terminated upon subsequent detection of further joint zero transitions ($ND_A$, $ND_B$) in both signals (A, B) in two scanning operations, separated only by said switching time ($T_S$).

9. An electronic slide caliper having a rule and a slide arranged on said rule for displacement thereon in a longitudinal direction, a marking (14) being provided on said rule (10) comprising longitudinal marks (15) disposed periodically in said longitudinal direction at a grid pitch ($2\pi$), said caliper comprising further at least two sensors arranged on said slide and responding to said marking, said sensors being offset relative to each other by a predetermined amount ($n\pi \pm \pi/2$) being unequal to n times half said grid pitch ($\pi$) with n being an integer number so that when said slide is displaced along said rule, periodic voltage signals (A, B) generated by said sensors are offset in phase ($\Delta\phi$) relative to each other, said caliper comprising, further, computing means for numerically processing pulses derived from said signals (A, B) as a function of a sign of said phase offset ($\Delta\phi$), wherein said computing means comprises:

first means for scanning periodically at least one of said signals (A, B) at a predetermined scanning rate ($\Delta t$);

second means for storing said scanned signal values ($U_A$, $U_B$);

third means for comparing successive signal values ($U_{40}$, $U_{58}$);

fourth means for generating a first characteristic value ($+\Delta U$) upon occurrence of a rise and a second characteristic value ($-\Delta U$) upon occurrence of a decrease between said successive signal values ($U_{40}$, $U_{58}$);

fifth means for storing the respective last but one of said signal values ($U_{46}$, $U_{53}$) as a maximum (MX) upon occurrence of transition from said first characteristic value ($+\Delta U$) to said second characteristic value ($-\Delta U$), or as a minimum (MN) upon occurrence of a transition from said second characteristic value ($-\Delta U$) to said first characteristic value ($+\Delta U$);

sixth means for deriving an arithmetic mean value from successive maximum signal values ($U_{46}$) and minimum signal values ($U_{53}$);

seventh means for storing said mean values as zero-voltage values ($U_N$);

eighth means for comparing said signal values ($U_{40}$–$U_{58}$) with said respective zero-voltage value ($U_N$);

ninth means for generating a third characteristic value ($+U$) during presence of said signal values ($U_{42}$–$U_{49}$, $U_{58}$) being above said zero-voltage value ($U_N$), and a fourth characteristic value ($-U$) during presence of signal values ($U_{40}$–$U_{41}$, $U_{50}$–$U_{57}$) being below said zero-voltage value ($U_N$);

tenth means for storing the respective last signal value ($U_{42}$, $U_{50}$, $U_{58}$) as zero transition (ND) upon occurrence of transition between said third characteristic value ($+U$) and said fourth characteristic value ($-U$); and eleventh means for counting the number of zero transitions (ND).

* * * * *